United States Patent [19]

Gugin

[11] Patent Number: 5,036,721
[45] Date of Patent: Aug. 6, 1991

[54] SHIFT CONTROL MECHANISM FOR A MANUAL TRANSMISSION

[75] Inventor: David G. Gugin, Howell, Mich.

[73] Assignee: General Motors Corporation, Detroit, Mich.

[21] Appl. No.: 589,552

[22] Filed: Sep. 28, 1990

[51] Int. Cl.$^5$ .................. B60K 20/00; F16H 59/02
[52] U.S. Cl. .................. 74/476; 74/473 R; 74/475; 74/477
[58] Field of Search .................. 74/473 R, 475, 476, 74/477

[56] References Cited

U.S. PATENT DOCUMENTS

| | | | |
|---|---|---|---|
| 3,264,893 | 9/1966 | Stott et al. | 74/473 R X |
| 4,539,859 | 9/1985 | Arai et al. | 74/475 |
| 4,543,846 | 10/1985 | Inui et al. | 74/477 |
| 4,569,247 | 2/1986 | Inui et al. | 74/475 |
| 4,584,894 | 4/1986 | Fogelberg | 74/473 R |
| 4,638,678 | 1/1987 | Gorman et al. | 74/476 |
| 4,785,681 | 11/1988 | Kuratsu et al. | 74/339 |

Primary Examiner—Allan D. Herrmann
Assistant Examiner—David W. Laub
Attorney, Agent, or Firm—Donald F. Scherer

[57] ABSTRACT

The present invention is directed to a shift control mechanism (10) that may be incorporated in a transmission gear housing (11) to operate in conjunction with the input from a manual shift selecting lever (12). The shift control mechanism (10) has a shift selecting shaft (14) mounted within the transmission gear housing (11) for rotation and axial translation in response to selective manipulation of the shift selecting lever (12). A sleeve (31) is supported from the transmission gear housing (11), and an actuating member (20) is secured to the shift selecting shaft (14) for rotation, and axial translation, with the shift selecting shaft (12). A plurality of synchronizer assemblies (28) are also located within the transmission gear housing (11), and the actuating member (20) individually operates the synchronizer assemblies (28) in response to selected manipulation of the shift selecting lever (12). Alignment guide means (61) are carried on the shift selecting shaft (14) to present locating means (70, 71 and 72). Locator means (60) are presented from the shift sleeve (31) to interact with the locating means (70, 71 and 72) presented from the alignment guide means (60) in order to permit axial translation of the shift selecting shaft (14) only when the shift selecting shaft (14) has been rotated to align the locator means (60) with one of the locating means (70, 71 or 72).

5 Claims, 2 Drawing Sheets

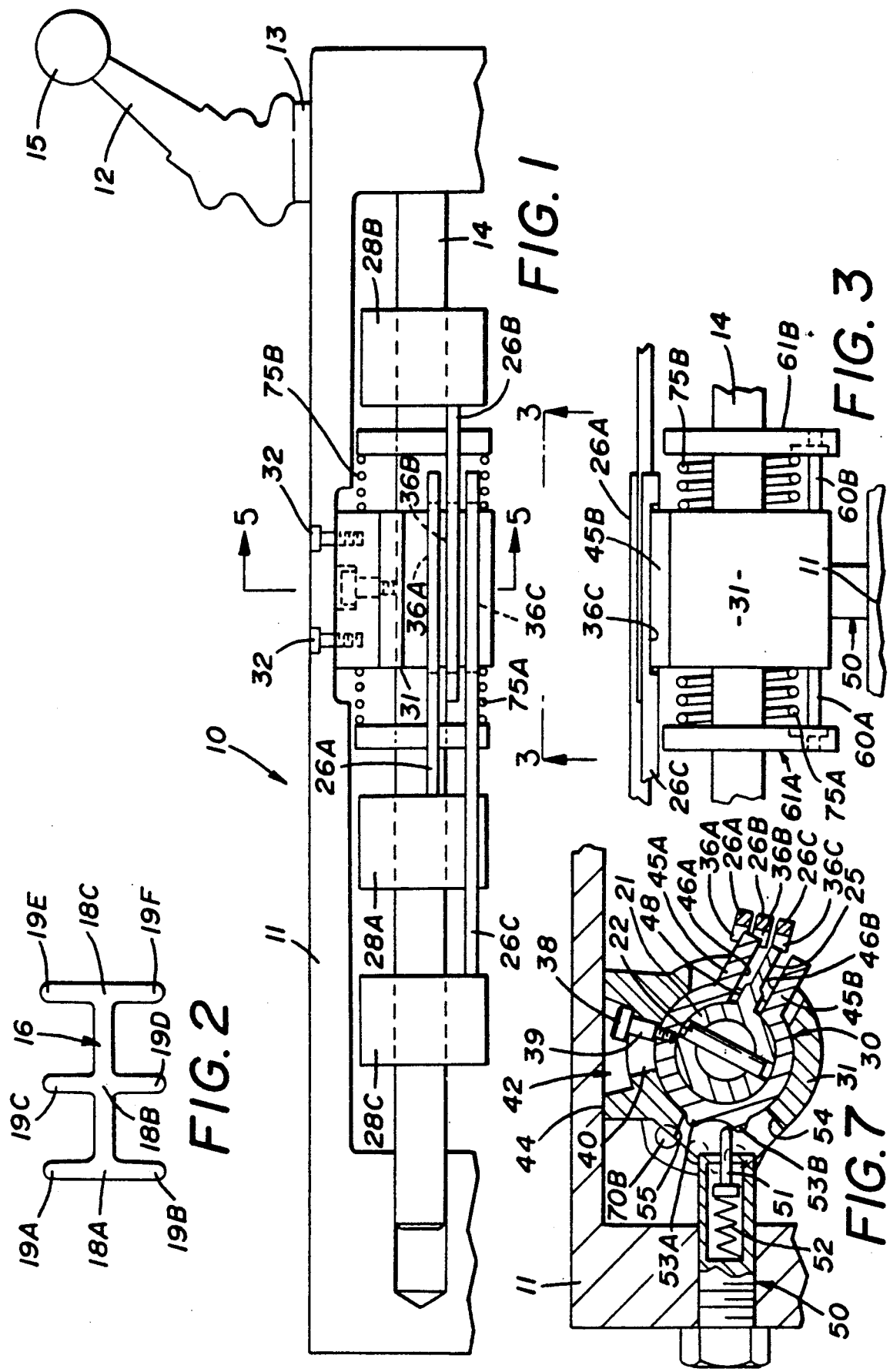

SHIFT CONTROL MECHANISM FOR A MANUAL TRANSMISSION

TECHNICAL FIELD

The present invention relates to manual transmissions. More particularly, the present invention relates to a shift control mechanism for manual transmissions—the shift control mechanism precluding inadvertently shifting between a forward gear and the reverse gear, or vice versa. Specifically, the present invention relates to a shift control mechanism which employs an alignment means that blocks direct planar movement of the shifting lever to shift, either into reverse from a forward gear or out of reverse into a forward drive gear, and which employs a compatible structure to prevent more than one drive gear from being actuated at the same time.

BACKGROUND OF THE INVENTION

A transmission is incorporated in a vehicular drive train between the engine and the drive wheels to provide a plurality of gear ratios for moving forwardly and generally one gear ratio for moving rearwardly. The transmission is a necessary part of a vehicular drive train, because internal combustion engines can deliver only limited torque at low revolutions per minute (RPM). The transmission allows the speed of the engine to be maintained within its optimum operating range for the delivery of maximum torque or power, as the vehicle accelerates from a stationary or "stopped" position to the desired speed. The speed reduction between the RPM of the engine and the resulting rotation of the drive wheels provided by a transmission effects a controlled application of the torque by which the drive wheels are rotated. Accordingly, when that gear ratio commonly designated as "low" or "first" gear is selected, the transmission imparts less speed to the drive wheels, but imparts more torque from the engine to rotate the drive wheels in order to overcome the static inertia of the vehicle and effect forward movement. As the speed of the vehicle increases, the transmission may be selectively shifted through the plurality of gear ratios it provides in order to impart progressively greater rotational speed to the drive wheels with concomitantly lesser torque.

Many manual transmissions provide three forward gear ratios. These transmissions are generally identified as "three-speed" transmissions, but "four-speed" and "five-speed" transmissions are also quite common, because they permit an engine to operate within a smaller optimal speed range, while effecting progressively increasing forward speed to the vehicle. Irrespective of the exact number of gear ratios provided, manual transmissions offer a plurality of forward speed gear ratios from which the driver may select—though normally the selection is sequential—to transmit torque from the engine to the drive wheels. Generally, only a single reverse gear ratio is provided. When using a manual transmission the selection of a specific gear ratio is made by the driver.

Transmissions which employ an even number of forward gear ratios—such as a four-speed transmission—generally effect the shift between the first and the second gear ratios as well as between the third and the fourth gear ratios by movement of the shift selecting lever in at least two separate planes. In such transmissions, the aforesaid two planar movements are laterally displaced, one with respect to the other, and the shift selecting lever is capable of being laterally displaced between the lateral locations of the planar movements which effect the shift into the desired forward gear ratio only when the shift lever is in "neutral".

To select the reverse gear, the shift selecting lever is moved into an even further lateral displacement, also when the shift selecting lever is in neutral, and then moved within a third plane. This third plane is parallel to those planes within which the shift selecting lever is moved to effect selection of the forward drive ranges. In such an arrangement, it is impossible to move the shift selecting lever within a common plane between any of the forward gear ratios and the reverse gear ratio, or vice versa.

On the other hand, in transmissions which employ an odd number of forward gear ratios, the lateral displacement of the shift selecting lever required for shifting into reverse is often coincident with that lateral displacement of the shift selecting lever required for shifting into one of the forward gear ratios. With the planar movement required to shift into reverse being thus aligned with the planar movement to shift into one of the forward drive ratios, it would be possible to shift from a forward gear ratio directly into reverse, unless some mechanism, or structure, has been included in the transmission to preclude inadvertent movement therebetween.

The prior art knows many structural arrangements which preclude inadvertent shifting between one of the forward gear ratios and the reverse gear ratio, and, for the most part, they have been quite successful in effecting the desired result. Examples are the usage of a button or lever, which will disengage a reverse inhibitor, allowing the shift mechanism to engage reverse gear. This mechanism, however, not only adds to the cost of the transmission, inasmuch as it requires a great number of parts which require additional machining to insure the desired accuracy and proper operation of the transmission, but is also of at least modest inconvenience to the driver, in view of the additional manipulations required to effect a shift into reverse.

Another structural arrangement employed to preclude inadvertent shifting between the forward and reverse ranges, even with an odd number of forward shift ranges, requires that the shift lever be laterally displaced into a distinct planar path which is reserved for shifting into the reverse range. Heretofore, this arrangement has not gained wide acceptance because it was relatively complex and required what is deemed to be too many parts, and, when implemented, was considered to be moderately inconvenient to the driver.

SUMMARY OF THE INVENTION

It is, therefore, a primary object of the present invention to provide an improved structural arrangement for a shift mechanism.

It is another object of the present invention to provide an improved structural arrangement for a shift mechanism which requires convenient and consistent shift movements that are capable of actuating only one synchronizer assembly at a time.

It is a further object of the present invention to provide an improved structural arrangement for a shift mechanism, as above, which provides a neutral bias to identify each of a plurality of lateral displacements of the shift selecting lever at which either of two gear ratios can be selected.

It is another object of the present invention to provide an improved structural arrangement for a shift mechanism, as above, which incorporates a relatively uncomplicated locating means that precludes actuating more than one gear range at a time, and that also precludes direct planar movement of the shift selecting lever between its positions required to select any forward gear range and its position required to select reverse, or vice versa.

It is yet another object of the present invention to provide an improved structural arrangement for a shift mechanism, as above, which does not require special or complex construction of the shift tower or the shift selecting lever and which does not require the use of a gate.

It is a still further object of the present invention to provide an improved structural arrangement for a shift mechanism, as above, which is not only relatively uncomplicated but which is also relatively inexpensive to manufacture, install and maintain, and which can be incorporated directly in the transmission.

These and other objects of the invention, as well as the advantages thereof over existing and prior art forms, which will be apparent in view of the following detailed specification, are accomplished by means hereinafter described and claimed.

In general, a shift control mechanism embodying the concepts of the present invention may be incorporated in the transmission gear housing to operate in conjunction with the input from a manual shift selecting lever. The shift control mechanism has a shift selecting shaft mounted within the transmission gear housing for rotation and axial translation in response to selective manipulation of the shift selecting lever. A shift sleeve may be supported by the transmission gear housing, and an actuating member, which is housed within the shift sleeve, is secured to the shift selecting shaft for rotation and axial translation with the shift selecting shaft.

A plurality of synchronizer assemblies are also located within the transmission gear housing, and the actuating member individually operates the synchronizer assemblies in response to selected manipulation of the shift selecting lever. Alignment guide means are carried on the shift selecting shaft to present locating means. Locator means are presented from the shift sleeve to interact with the locating means presented from the alignment guide means in order to permit axial translation of the shift selecting shaft only when the shift selecting shaft has been rotated to align the locator means with an appropriate locating means.

One exemplary embodiment of a shift control mechanism, embodying the concepts of the present invention, is deemed sufficient to effect a full disclosure of the subject invention. The exemplary shift control mechanism is described in detail without attempting to show all of the various forms and modifications in which the invention might be embodied; the invention being measured by the appended claims and not by the details of the specification.

BRIEF DESCRIPTION OF THE DRAWINGS

FIG. 1 is a schematic, side elevation depicting an exemplary shift control mechanism embodying the concepts of the present invention which may be located within the transmission gear housing, and similarly depicting the shift synchronizer assemblies with which the shift control mechanism may be employed.

FIG. 2 is a schematic plan view of the shift pattern through which the shift selecting lever is movable to select the desired drive ratio.

FIG. 3 is a partial bottom plan taken substantially along line 3—3 of FIG. 1 to depict the interrelationship of the actuating member and the shift rails in the exemplary shift control mechanism.

FIG. 7 is a view similar to FIGS. 5 and 6, and appearing on the same sheet of drawings as FIGS. 1 through 3, but depicting the the relationship of the components when the shift selecting lever is in the third of the neutral zones.

DESCRIPTION OF AN EXEMPLARY EMBODIMENT

Figure 5:
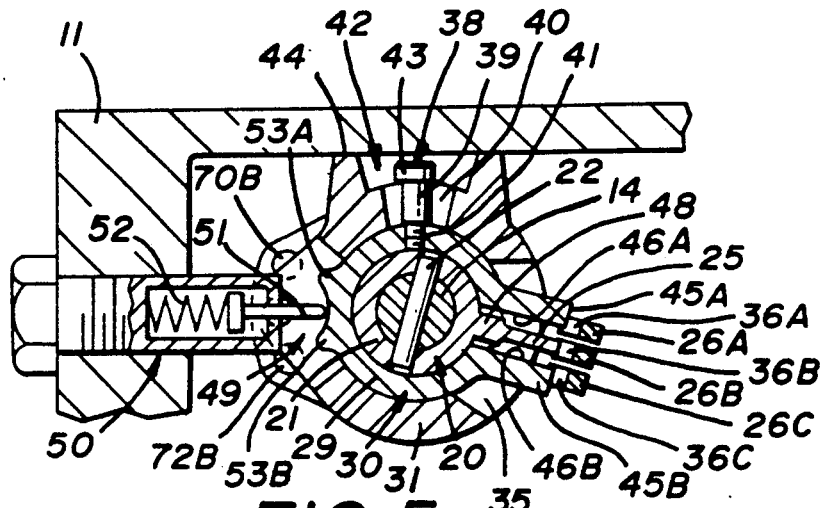
FIG. 5 is an enlarged cross section taken substantially along line 5—5 of FIG. 1 which depicts the relationship of the components within the shift control mechanism when the shift selecting lever is one of the three neutral zones.
Figure 6:
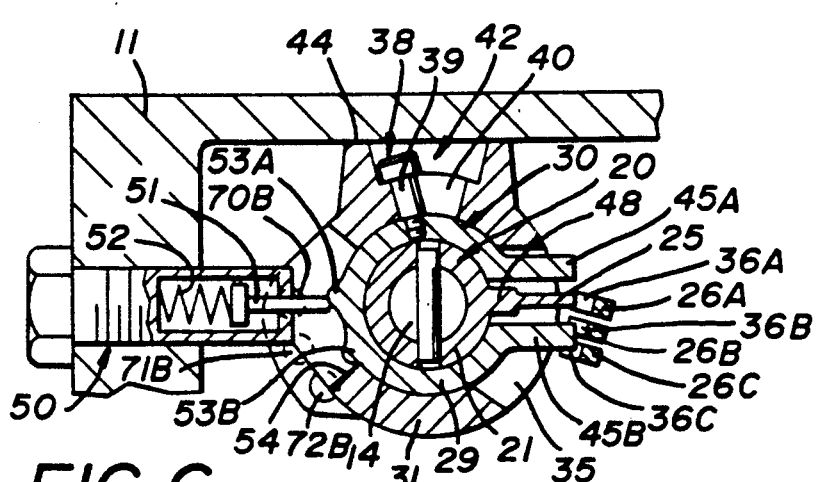
FIG. 6 is a view similar to FIG. 5 but depicting the relationship of the components when the shift selecting lever is in a second of the neutral zones.
Figure 4:
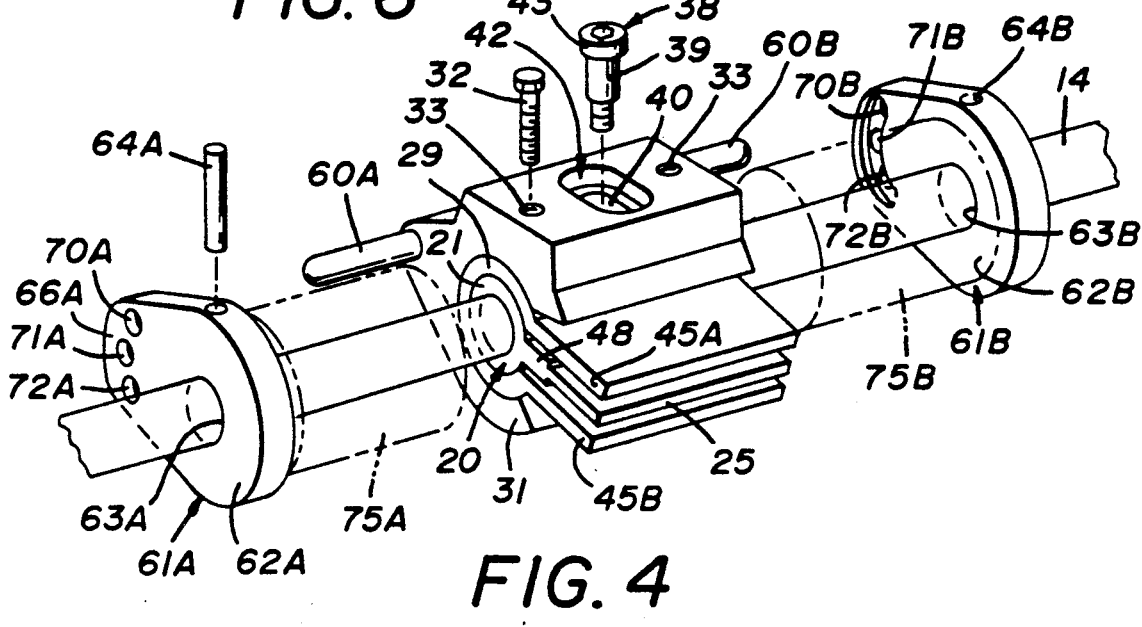
FIG. 4 is an exploded perspective of the shift control mechanism depicted in the previous figures.

A representative shift control mechanism embodying the concepts of the present invention is designated generally by the numeral 10 on the accompanying drawings. The shift control mechanism 10, as will be more fully hereinafter described, is particularly adapted for use with manual transmissions which may be installed in vehicles. The shift control mechanism 10 may be incorporated directly within the transmission gear housing 11 to be operated by a shift selecting lever 12 presented from a remotely located shift tower 13. The lever 12 is disposed in convenient proximity to the driver of the vehicle, in which the shift control mechanism 10 is installed. The shift selecting lever 12 is mounted from the shift tower 13 to effect not only lateral but also fore and aft movement, as is well known to the art.

In the exemplary shift control mechanism 10 depicted in the drawings, a shift selecting shaft 14 is operatively connected to the shift selecting lever 12 in a well known manner so that the shaft 14 will rotate in response to lateral movement of the handle 15 presented from the shift selecting lever 12. As is also well known, that same operative connection ensures that the shaft 14 will also be translated axially in response to fore and aft movement of the handle 15 on the shift selecting lever 12.

With particular reference to FIG. 2, lateral movement of the handle 15 will effect movement of the shift selecting lever 12 along the pathway 16 which generally defines the neutral range of the shift control mechanism 10. As will be hereinafter more fully described, there are three neutral zones 18A, 18B and 18C within the neutral range 16, and the three neutral zones may be identified by the tactile indications resulting from the interaction of detent delineators incorporated within the shift control mechanism 10, as is also hereinafter more fully described. It is the lateral movement of the shift selecting lever 12 between the respective neutral zones 18A, 18B and 18C which effects the desired rotation of the shift selecting shaft 14.

Forward movement of the shift selecting lever 12 from the neutral zone 18A into shift position 19A, axially translates the shift selecting shaft 14 to actuate the lowest or first forward drive range; and aft movement of the shift selecting lever 12 from or through the neutral zone 18A into the shift position 19B, axially translates the shift selecting shaft 14 to actuate the second forward drive range. The movement of the shift selecting lever 12 between the first and second drive ranges—i.e., the shift position 19A and 19B, respectively—in the embodiment depicted may be a purely planar movement which appears nearly linear and may, on occasion, be so designated herein.

Similarly, forward movement of the shift selecting lever 12 from the neutral zone 18B into shift position 19C, axially translates the shift selecting shaft 14 to actuate the third forward drive range; and aft movement of the shift selecting lever 12 from or through the neutral zone 18B into shift position 19D axially translates the shift selecting shaft 14 to actuate the fourth drive range. The movement of the shift selecting lever 12 between the third and fourth drive ranges—i.e., the shift positions 19C and 19D, respectively—in the embodiment depicted is also a purely planar movement which also appears nearly linear and may also, on occasion, be so designated herein, and that movement is laterally displaced from the planar movement which selects either the first or second drive ranges.

Finally, forward movement of the shift selecting lever 12 from the neutral zone 18C into the shift position 19E, axially translates the shift selecting shaft 14 to actuate the fifth forward drive range, and aft movement of the shift selecting lever 12 from or through the neutral zone 18C into the shift position 19F axially translates the shift selecting shaft 14 to actuate the reverse drive range. The movement of the shift selecting lever 12 between the fifth and reverse drive ranges—i.e., the shift positions 19E and 19F, respectively—however, is not planar, nor does it appear to be linear. It is that lack of linearity which precludes inadvertently shifting between the reverse range and any of the forward ranges, or vice versa.

The structure which accomplishes that result is hereinafter more fully described. In any event, the movements which select either the fifth or the reverse drive ranges are also laterally displaced from the planar movements which select the first or second drive ranges as well as the planar movements which select the third or fourth drive ranges.

As best seen in FIGS. 4 through 7, an actuating member 20 is secured to the shift selecting shaft 14 for rotation and axial translation with the shift selecting shaft 14. Specifically, the actuating member 20 has a hub portion 21 which circumscribes the shift selecting shaft 14 and which is secured thereto by a connecting pin 22 that passes through a bore in the shift selecting shaft 14 and aligned bores in the hub portion 21 of the actuating member 20. A paddle portion 25 extends radially outwardly from the hub portion 21 selectively to engage the plurality of shift rails 26A, 26B and 26C which actuate the shift synchronizers 28A, 28B and 28C, respectively.

The operation of the shift synchronizer assemblies to effect the actual shifting of the gears within the transmission is well known to the art and need not be further described herein.

The hub portion 21 of the actuating member 20 is, in turn, substantially circumscribed by the hub portion 29 of a lock-out member 30, and the hub portion 29 of the lock-out member 30 is received within a sleeve 31 that is fixedly secured to the transmission gear housing 11.

As represented in FIG. 1, one or more bolts 32 may extend through the housing 11 to be secured within appropriately disposed threaded bores 33 in the sleeve 31. The sleeve 31 must be circumferentially discontinuous, as at 35, to permit the paddle portion 25 of the actuating member 20 to extend radially outwardly beyond the sleeve 31.

To effect the necessary axial translation of the shift rails 26 required to operate the synchronizer assemblies 28, each shift rail 26 is provided with a connecting recess 36. The connecting recesses 36 in the three shift rails 26 are each capable of longitudinally embracing the paddle portion 25 on the actuating member 20, so that axial movement of the actuating member 20 will longitudinally translate whichever shift rail 26 is engaged by the actuating member 20. Specifically, the interaction between the paddle portion 25 with whichever connecting recess 36 is then embracing the paddle portion 25 forces that shift rail 26 to be translated in response to translation of the shift selecting shaft 14.

As may be apparent from the continuing detailed description, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are shift rails which are generally identified by the numeral 26 to operate the shift synchronizer assemblies 28, but the three shift rails are specifically and individually identified as 26A, 26B and 26C in the specification and on the drawings when it is desired, or necessary, to identify the particular shift rail 26A, 26B or 26C, which operates a specific shift synchronizer assembly 28A, 28B or 28C, respectively. This same suffix convention shall be employed throughout the specification.

The lock-out member 30 must be free to rotate with the shift selecting shaft 14, but the lock-out member 30 must not be translatable with the shift selecting shaft 14. This result may be achieved by the use of a retainer 38. Specifically, the retainer 38 may employ a shaft portion 39 which extends through a slot 40 in the sleeve 31. The slot 40 is oriented circumferentially with respect to the hub portion 29 of the lock-out member 30, and the shaft portion 39 which extends through the slot 40 is firmly received within a radially oriented bore 41 in the hub portion 29 of the lock-out member 30. For convenience a bolt may serve as the retainer 38, and in that situation the slot 40 may be located along the base of a recess 42 in the sleeve 31. The recess 42 may then receive the head 43 of the bolt which serves as the retainer 38 in order to maintain the head 43 below the level of the outer surface 44 on the sleeve 31, if desired or required.

A pair of blocking tabs 45A and 45B project radially outwardly from the hub portion 29 of the lock-out member 30 to penetrate the circumferential discontinuity 35 of the sleeve 31, and extend axially thereof such that the blocking tabs 45 each have the same longitudinal dimension as the paddle portion 25 of the actuating member 20. In addition, the two blocking tabs 45 also extend outward to such an extent that they are substantially radially coterminous with the paddle portion 25.

To effect rotation of the lock-out member 30 in response to rotation of the shift selecting shaft 14, and under the condition that the lock-out member 30 must not be translatable with the shift selecting shaft 14, it is convenient to effect the desired rotation of the lock-out member 30 by rotational interaction between the paddle portion 25 and the opposed blocking tabs 45A and 45B, and yet the opposed surfaces 46A and 46B on the respective blocking tabs 45A and 45B are laterally spaced such that when the paddle portion 25 engages the connecting recess 36 in one of the shift rails 26, neither blocking tab 45A nor 45B will engage that same connecting recess 36. As such, the spacing between the opposed surfaces 46A and 46B will likely be greater than the thickness of at least that radial extent of the paddle portion 25—measured in the same direction—which is embraced by the connecting recesses 36A, 36B or 36C on the corresponding shift rails 26A, 26B or 26C. However, the juncture of the paddle portion 25 with the hub portion 21 of the actuating member 20 may include a shoulder 48, the opposite surfaces of which slidably engage the opposed surfaces 46A and 46B on the laterally spaced blocking tabs 45A and 45B, respectively. Such an arrangement assures that the lock-out member 30 rotates in direct response to rotation of the actuating member 20 and thereby the shift control shaft 14. On the other hand, the circumferential dimension or thickness of the blocking tabs 45 is such that whenever the paddle portion 25 is embraced by the connecting recess 36 on one of the shift rails 26, one or both of the blocking tabs 45 are also embracingly engaged by the connecting recesses 36 on the other shift rails 26. When the paddle portion 25 is translated axially, it will be able to effect axial translation of only one of the shift rails 26, while the other two shift rails 26 are positively immobilized by the interaction of the connecting recesses 36 on those other shift rails 26 with one or both of the blocking tabs 45.

In addition to being circumferentially discontinuous, the sleeve 31 is also provided with an aperture 49 through which a neutral control means 50, presented from the transmission gear housing 11, can interact with the lock-out member 30. The neutral control means 50 employs a plunger 51 which is supported from the transmission gear housing 11 and is biased, as by spring 52, to engage the lock-out member 30 through the aperture 49. The lock-out member 30 is provided with a pair of circumferentially spaced, longitudinally extending ribs 53A and 53B, which project radially outwardly from the lock-out member 30 to interact with the spring biased plunger 51 and thereby provide a tactile indication as to the hereinbefore described neutral zones 18A, 18B and 18C.

When the plunger is received between the cusps of the two ribs 53A and 53B, as depicted in FIG. 5, the shift control mechanism 10 is in neutral zone 18B. However, when the shift selecting shaft 14 is rotated counterclockwise, the plunger 51 is caused to retract by the rib 53A. The retainer 38 may engage the edge of slot 40 to limit further rotation of the sleeve 31. Conversely, when the shift selecting shaft 14 is rotated clockwise, the plunger 51 is caused to retract by the rib 53B. The retraction of the plunger 51 by the ribs 53A and 53B affords the heretofore mentioned tactile indication to the driver.

The shift control mechanism 10 preferably also incorporates a structural arrangement which is interactive between the shift selecting shaft 14 and the transmission gear housing 11 to preclude actuation of the shift synchronizers 28 when the shift selecting lever 12 is properly disposed. Specifically, the interaction occurs between the sleeve 31 and the shift selecting shaft 14 to preclude axial translation of the shift selecting shaft 14, unless it has been rotated to the precise angular orientation for the gear ratio to be selected. In short, a pair of oppositely directed locator means 60A and 60B (FIG. 4) are presented from the sleeve 31 for engagement with corresponding alignment guide means 61A and 61B fixedly secured to the shift selecting shaft 14.

The alignment guide means 61A and 61B each have planar hub portions 62A and 62B, respectively, which are each disposed transversely to the axis of the shift selecting shaft 14, with one on either side of the sleeve 31, so that the shift selecting shaft 14 can be received through bores 63A and 63B which penetrate the respective hub portions 62A and 62B of the alignment guide means 61A and 61B. A connecting pin 64A penetrates the hub portion 62A of the alignment guide means 61A as well as the shift selecting shaft 14, and a pin 64B similarly penetrates the hub portion 62B of the alignment guide means 61B as well as the shift selecting shaft 14. The connecting pins 64A and 64B thus rigidly secure the two alignment guide means 61A and 61B to the shift selecting shaft 14 so that angular rotation of the shift selecting shaft 14 effects precisely the same angular rotation to the alignment guide means 61.

A lobe 66 extends radially outwardly from each hub portion 62 of each alignment guide means 61, and each lobe 66 is provided with a plurality of precisely located bores. In the exemplary arrangement, there are three bores 70, 71 and 72 in each lobe 66, and those bores are each adapted to receive the locator means 60 when the shaft 14 has been properly rotated and thereby to allow axial translation of the shift selecting shaft 14. Conversely, when the shaft 14 is not in the precise angular disposition required to effect the desired shift, the bores 70, 71 and 72 will not receive the locator means 60, and axial translation of the shift selecting shaft 14 is thereby precluded.

The locator means 60A and 60B may, therefore, be formed as pins which extend outwardly from the sleeve 31 in parallel relation to the axis of the shift selecting shaft 14, as depicted in the drawings. As such, the pin-like locator means 60A will engage bore 70A when one shifts into the first or lowest drive range; locator means 60A will likewise engage bore 71A when one shifts into the third forward drive range; and, locator means 60A will engage bore 72A when one shifts into the fifth forward drive range. Conversely, the pin-like locator means 60B will engage bore 70B when one shifts into the second forward drive range; locator means 60B will engage bore 71B when one shifts into the fourth forward drive range; and, locator means 60B will engage bore 72B when one shifts into the reverse drive range.

The precision effected by selective location of the locator means 60 and the bores 70, 71 and 72 is greater than the precision of the angular disposition required for proper engagement between the paddle portion 25 and one of the connecting recesses 36 or between the blocking tabs 45 and the other two connecting recesses 36. Hence, the alignment of the locator means 60 with the bores 70A and 70B, as well as 71A and 71B, may be such as to permit planar movement of the shift selecting lever 12 between the first and second forward drive ranges as well as between the third and fourth drive ranges. The relative location of the locator means 60A and 60B with respect to the bores 72A and 72B, however, is such that planar movement of the shift lever 12 will not effect a shift between the fifth forward drive range and the reverse drive range. As such, even a modest circumferential displacement of the bore 72B will preclude planar linearity in the movement of the shift selecting lever 12 to shift between the fifth forward gear range and the reverse gear range and vice versa.

As depicted, compression spring means 75A and 75B may be interposed between the sleeve 31 and the respective, two alignment guide means 60A and 60B to provide a neutral bias to the shift control mechanism 10 when one is shifting out of a drive range. Those skilled in the art will understand that the mechanism of the synchronizer assemblies 28 will normally retain the transmission in the selected drive range until the driver begins the shift out of a particular drive range, but that mechanism is not important to the present invention, and it will not, therefore, be further described.

OPERATION

The operation of the afore-described shift mechanism 10 can best be understood by starting with the shift selecting lever 12 in neutral zone 18B. With the shift selecting lever 12 so disposed, the plunger 51 is biased by spring 52 to engage the hub portion 29 of the lock-out mechanism 30 between the two ribs 53A and 53B, as depicting in FIG. 5. To shift into the first or lowest forward drive range, the driver laterally displaces the handle 15 to swing the shaft selecting lever 12 into neutral zone 18A. That lateral movement of the shift selecting lever 12 effects rotation of the shift selecting shaft 14, and rotation of shaft 14 causes the actuating member 20—which is secured to the shaft 14 as by pin 22—to rotate.

Rotation of the actuating member 20 drives the shoulder 48 presented at the juncture of the hub portion 21 with the paddle portion 25 against the opposed surface 46A on blocking tab 45A. The lock-out member 30 is thereby rotated within the sleeve 31 to the position depicted in FIG. 6. That rotation of the lock-out member 30 forces plunger 51 to retract as it rides up the rib 53A. The interaction of the detent 50 with the rib 53A provides tactile feedback to the driver which signals that the shift selecting lever 12 is moving into neutral zone 18A.

The aforesaid lateral movement of the shift selecting member 12 into neutral zone 18A not only swings the paddle portion 25 on the actuating member 20 into the connecting recess 36A on shift rail 26A, but also swings the blocking tab 45B on the lock-out member 30 into the connecting recesses 36B and 36C on shift rails 26B and 26C. The same rotation of the shift selecting shaft 14 also brings the bore 70A into alignment with the locator pin 60A. Thus, when the driver pushes forwardly on the handle 15 to swing the shift selecting lever 12 into the first or lowest forward drive ratio identified as position 19A in FIG. 2, the forward swinging movement of the shift selecting lever 12 effects axial translation of the shift selecting shaft 14 so that the bore 70A in the alignment guide means 61A engages and slides along the locator pin 60A. This permits the paddle 25 to translate axially with the shift selecting shaft 14 and thereby force translation of the shift rail 26A.

The lock-out member 30, however, cannot translate axially with the shift selecting shaft 14 because of the interaction between the shaft portion 39 of the retainer 38 presented from the lock-out member 30 and the sleeve 31. This axial immobility of the lock-out member 30 secures the shift rails 26B and 26C against axial translation, thereby precluding operation of the shift synchronizers 28B and 28C when the shift lever 12 is positioned to translate the shift rail 26A. Translation of the shift rail 26A in response to movement of the shift lever 12 forwardly from the neutral zone 28A into the shift position 19A, actuates the shift synchronizer 28A to shift the transmission into the first or lowest forward drive range.

With the shift control mechanism 10 having effected a shift into the first or low drive range, the locator pin 60B is also aligned with the bore 70B in the alignment guide means 61B so that when the driver desires, the shift selecting lever 12 can be moved rearwardly through the neutral zone 18A toward the second drive range position 19B, and that movement effects axial translation of the shift selecting shaft 14 so as to disengage the alignment guide means 61A from the locator pin 60A, and at the same time, cause the bore 70B on the alignment guide means 61B to engage the locator pin 60B, thus permitting actuation of the shift synchronizer 28A to effect a shift from low into the second forward drive range.

To shift into the third forward drive range, the driver moves the shift selecting lever 12 forwardly from the low drive position 19B into neutral zone 18A, and then laterally displaces the handle 15 to swing the shaft selecting lever 12 into neutral zone 18B. That lateral movement of the shift selecting lever 12 effects rotation of the shift selecting shaft 14 as well as the actuating member 20 secured thereto. That rotation of the actuating member 20 drives the shoulder 48 presented at the juncture of the hub portion 21 with the paddle portion 25 against the opposed surface 46B on blocking tab 45B to rotate the lock-out member 30 within the sleeve 31 to the position depicted in FIG. 5. That rotation of the lock-out member 30 permits plunger 51 to extend so that the plunger will be contained between the cusps of the ribs 53A and 53B. This interaction of the detent 50 with the rib 53A provides tactile feedback to the driver which signals that the shift selecting lever 12 is moving into neutral zone 18B.

The aforesaid lateral movement of the shift selecting member 12 into neutral zone 18B not only swings the paddle portion 25 on the actuating member 20 into the connecting recess 36B on shift rail 26B, but also simultaneously swings the blocking tab 45B on the lock-out member 30 out of connecting recess 36B on shift rail 26B while maintaining the tab 45B within connecting recess 36C on shift rail 26C. This rotation of the lock-out member 30 also swings the tab 45A into the connecting recess 36A on shift rail 26A, and at the same time brings the bore 71A into alignment with the locator pin 60A.

Thus, when the driver pushes forwardly on the handle 15 to swing the shift selecting lever 12 into the third forward drive ratio, identified as position 19C in FIG. 2, the forward swinging movement of the shift selecting lever 12 effects axial translation of the shift selecting shaft 14 so that the bore 71A in the alignment guide means 61A engages and slides along the locator pin 60A. This permits the paddle 25 to translate axially with the shift selecting shaft 14 and thereby force translation of the shift rail 26B. Because the lock-out member 30 cannot translate axially with the shift selecting shaft 14, the lock-out member secures the shift rails 26A and 26C against axial translation, thereby precluding operation of the shift synchronizers 28A and 28C when the shift lever 12 is positioned to translate the shift rail 26B. Translation of the shift rail 26B in response to movement of the shift lever 12 forwardly from the neutral zone 28B into the shift position 19C, actuates the shift synchronizer 28B to shift the transmission into the third, forward drive range.

With the shift control mechanism 10 having effected a shift into the third drive range, the locator pin 60B is also aligned with the bore 71B in the alignment guide means 61B so that when the driver desires, the shift selecting lever 12 can be moved rearwardly through the neutral zone 18B toward the fourth drive range position 19D, and that movement effects axial translation of the shift selecting shaft 14 so as to disengage the alignment guide means 61A from the locator pin 60A, and at the same time, cause the bore 71B on the alignment guide means 61B to engage the locator pin 60B, thus actuating the shift synchronizer 28B to effect a shift from third into the fourth forward drive range.

To shift into the fifth forward drive range, the driver moves the shift selecting lever 12 forwardly from the fourth drive position 19D into neutral zone 26B, and then laterally displaces the handle 15 to swing the shaft selecting lever 12 into neutral zone 18C. That lateral movement of the shift selecting lever 12 effects further rotation of the shift selecting shaft 14 as well as the actuating member 20 secured thereto. That rotation of the actuating member 20 drives the shoulder 48 presented at the juncture of the hub portion 21 with the paddle portion 25 against the opposed surface 46B on blocking tab 45B to rotate the lock-out member 30 within the sleeve 31. That rotation of the lock-out member 30 forces plunger 51 to retract as it rides up the rib 53B to provide tactile feedback to the driver which signals that the shift selecting lever 12 has moved into neutral zone 18C and out of the neutral zone 18B.

The aforesaid lateral movement of the shift selecting member 12 into neutral zone 18C not only swings the paddle portion 25 on the actuating member 20 into the connecting recess 36C on shift rail 26C, but also swings the blocking tab 45B out of the connecting recess 36C on shift rail 26C, and at the same time, swings the blocking tab 45A on the lock-out member 30 into the connecting recesses 36A and 36B on shift rails 26A and 26B, as depicted in FIG. 7. This rotation of the lock-out member 30 also brings the bore 72A into alignment with the locator pin 60A. Thus, when the driver pushes forwardly on the handle 15 to swing the shift selecting lever 12 into the fifth forward drive ratio, identified as position 19E in FIG. 2, the forward swinging movement of the shift selecting lever 12 effects axial translation of the shift selecting shaft 14 so that the bore 72A in the alignment guide means 61A engages, and slides along, the locator pin 60A. This permits the paddle 25 to translate axially with the shift selecting shaft 14 to force translation of the shift rail 26C.

Because the lock-out member 30 cannot translate axially with the shift selecting shaft 14, engagement of the blocking tab 45A with connecting recess 36A and 36B secures the shift rails 26A and 26B against axial translation, thereby precluding operation of the shift synchronizers 28A and 28B when the shift lever 12 is positioned to translate the shift rail 26C. Translation of the shift rail 26C in response to movement of the shift lever 12 forwardly from the neutral zone 28C into the shift position 19E actuates the shift synchronizer 28C to shift the transmission into the fifth forward drive range.

With the shift control mechanism 10 having effected a shift into the fifth drive range, the locator pin 60B is, however, not aligned with the bore 72B in the alignment guide means 61B so that when the driver attempts to move the shift selecting lever 12 rearwardly through the neutral zone 18C toward the reverse drive range position 19F, that planar movement will be blocked. The driver can move the shift selecting lever 12 into the neutral zone 18C, but he can not effect a shift into the reverse shift range until a conscious effort is made to move the shift selecting lever 12 laterally an amount sufficient to bring the locator pin 60B into axial alignment with the locator pin 60B. Only then can the driver axially translate the shift selecting shaft 14 so as to effect a shift into the reveres drive range.

As should now be apparent, the present invention not only provides a way for preventing direct shifting to and from reverse, but also accomplishes the other objects of the present invention.

The embodiments of the invention in which an exclusive property or privilege is claimed are defined as follows:

1. A shift control mechanism for a manual transmission having a transmission gear housing and a manual shift selecting lever, said shift control mechanism comprising: a shift selecting shaft mounted within the transmission gear housing for rotation and axial translation in response to selective manipulation of the shift selecting lever; a shift sleeve supported from the transmission gear housing; an actuating member secured to said shift selecting shaft for rotation and axial translation with said shift selecting shaft; a plurality of synchronizer assemblies; said actuating member individually operating said synchronizer assemblies in response to selected manipulation of said shift selecting lever; alignment guide means interactive between said shift selecting shaft and said transmission gear housing to permit axial translation of said shift selecting shaft only when said shift selecting shaft has been rotated to align a locator means with a locating means.

2. A shift control mechanism for a manual transmission having a transmission gear housing and a manual shift selecting lever, said shift control mechanism comprising: a shift selecting shaft mounted within the transmission gear housing for rotation and axial translation in response to selective manipulation of the shift selecting lever; a shift sleeve supported from the transmission gear housing; an actuating member secured to said shift selecting shaft for rotation and axial translation with said shift selecting shaft; a plurality of synchronizer assemblies; said actuating member individually operating said synchronizer assemblies in response to selected manipulation of said shift selecting lever; alignment guide means carried on said shift selecting shaft; locating means presented from said alignment guide means; locator means presented from said shift sleeve to interact with said locating means presented from said alignment guide means to permit axial translation of said shift selecting shaft only when said shift selecting shaft has been rotated to align said locator means with said locating means.

3. A shift control mechanism for a manual transmission having a transmission gear housing and a manual shift selecting lever, said shift control mechanism comprising: a shift selecting shaft mounted within the transmission gear housing for rotation and axial translation in response to selective manipulation of the shift selecting lever; a shift sleeve supported from the transmission gear housing; an actuating member affixed to said shift selecting shaft for rotation and axial translation with said shift selecting shaft; a plurality of synchronizer assemblies, each synchronizer providing two gear selections; a shift rail operatively interconnected with each said synchronizer assembly such that selected axial translation of said shift rail effects one of the gear selections provided by that synchronizer; selective rotation of said shift selecting shaft operatively positioning said actuating mechanism with respect to an individual shift rail; said actuating member individually operating said shift rails in response to axial translation of shift selecting lever; alignment guide means also secured to said shift selecting shaft; locating means presented from said alignment guide means; locator means presented from said shift sleeve to interact with said locating means presented from said alignment guide means to permit axial translation of said actuating member only when said shift selecting shaft has been rotated to align said locator means with said locating means; and lock-out means for selectively limiting the selection of the synchronizer assemblies.

4. A shift control mechanism, as set forth in claim 3, said lock-out means further comprising: a lock-out member; means operatively to secure said lock-out member to said shift sleeve such that said shift selecting shaft will axially translate independently of said lock-out member; and, means to connect said lock-out member to said shift selecting shaft such that said lock-out member rotates in response to rotation of said shift selecting shaft; said lock-out member permitting axial translation of only one shift rail at a time.

5. A shift control mechanism, as set forth in claim 4, wherein: one said synchronizer assembly effects operation of one forward as well as a reverse gear; said locating means associated with said one forward gear and said locating means associated with said reverse gear are misaligned with respect to said locator means such that said shift selecting shaft must be rotated to effect alignment of said locator means in order axially to translate the shift rail associated with said one synchronizer assembly between said one forward and said reverse gears.

* * * * *